United States Patent
Shyu

[19]

[11] Patent Number: 6,021,391
[45] Date of Patent: Feb. 1, 2000

[54] METHOD AND SYSTEM FOR DYNAMIC DATA ENCRYPTION

[75] Inventor: Rong-Fuh Shyu, Hsinchu, Taiwan

[73] Assignee: Winbond Electronics Corp., Taiwan

[21] Appl. No.: 09/034,184

[22] Filed: Mar. 3, 1998

[51] Int. Cl.[7] .................................. H04L 9/10; H04L 9/14
[52] U.S. Cl. ........................ 705/1; 380/21; 705/1
[58] Field of Search .................................. 707/10; 380/3, 380/23, 25, 48, 44, 4, 51, 55, 21; 709/200, 301

[56] References Cited

U.S. PATENT DOCUMENTS

| | | | |
|---|---|---|---|
| 4,850,018 | 7/1989 | Vogt ........................................... | 380/23 |
| 5,027,396 | 6/1991 | Platteter et al. ............................ | 380/4 |
| 5,359,659 | 10/1994 | Rosenthal ................................... | 380/4 |
| 5,568,555 | 10/1996 | Shamir ...................................... | 380/51 |

FOREIGN PATENT DOCUMENTS

| | | | |
|---|---|---|---|
| B-51249/90 | 9/1990 | Australia ....................... | G06F 13/38 |
| WO 92/004680 | 9/1992 | European Pat. Off. ......... | G06F 15/30 |
| WO 83/03018 | 1/1983 | WIPO .............................. | G07F 7/10 |
| WO 85/02310 | 5/1985 | WIPO ............................. | G06F 13/06 |
| WO 85/03584 | 8/1985 | WIPO ............................. | G06F 11/30 |
| WO 88/02202 | 3/1988 | WIPO ............................. | G06F 15/24 |
| WO 88/02960 | 4/1988 | WIPO ............................. | G06F 1/00 |

OTHER PUBLICATIONS

Gasser et al., "An architecture for practical delegation in a distributed system", Proc. of IEEE Computer SocietySymposium on Reserch in Security & Privacy, California, pp. 20–30, May 7, 1990.

Schneier, "Applied Cryptography: Protocols, Algorithms, & Source Code in C", John Wiley & Sons, Inc. pp. 417–429, 1994.

Hice et al., "DMS to the Government E–Mail Revolution", J.G. Van Dyke & Associates, Inc., Maryland, pp. 47–70, 1995.

*Primary Examiner*—James P. Trammell
*Assistant Examiner*—Cuong H. Nguyen
*Attorney, Agent, or Firm*—Fish & Richardson P.C.

[57] ABSTRACT

In a method and system for dynamic data encryption, a source data provider is used to provide a plurality of source data segments, while a segment header generator is employed to generate a plurality of segment headers that correspond respectively to the source data segments. Each of the segment headers includes a start code to indicate the start of the corresponding one of the data segments, a scrambling type to identify a selected one of at least two scrambling algorithms available for use when scrambling the corresponding one of the data segments, and a key word to be used during the scrambling of the corresponding one of the data segments. Each of the segment headers is placed before the corresponding one of the data segments, and each of the source data segments is scrambled according to the scrambling type and the key word identified in the corresponding one of the segment headers to obtain an encrypted data stream.

21 Claims, 4 Drawing Sheets

METHOD AND SYSTEM FOR DYNAMIC DATA ENCRYPTION

BACKGROUND OF THE INVENTION

1. Field of the Invention

The invention relates to data encryption, more particularly to a method and system for dynamic data encryption to achieve effective protection against software piracy during data transmission.

2. Description of the Related Art

With recent developments in digital technology, the transfer of data between two media in a computer-based platform for processing purposes has become easier. However, the ease in the spreading of data has made it difficult to provide security during data transmission. This problem is of utmost concern for materials subject to copyright protection, such as audio and video software. Presently, protection of software can be achieved by scrambling the original source data to obtain format-specific data that can be stored or transmitted. The format-specific data undergoes a reverse scrambling process at the retrieving or receiving end to recover the original source data.

It is noted that the scrambling algorithms employed in conventional data encryption systems are fixed throughout the software or the medium used to convey or store the encrypted data. As such, the protection against software piracy is weak once the scrambling algorithm has been broken by hackers.

SUMMARY OF THE INVENTION

Therefore, the object of the present invention is to provide a data encryption method and system for effectively guarding against piracy of source data during data transmission.

More specifically, the object of the present invention is to provide a method and system for dynamic data encryption, wherein the scrambling algorithm and the key word for the source data are dynamically changed to effectively guard against piracy when data is transferred between two entities, such as a transmitter and a receiver of a data processing system.

According to one aspect of the invention, a method for dynamic data encryption comprises the steps of providing a plurality of source data segments, and generating a plurality of segment headers that correspond respectively to the source data segments. Each of the segment headers includes a start code to indicate start of the corresponding one of the data segments, a scrambling type to identify a selected one of at least two scrambling algorithms available for use when scrambling the corresponding one of the data segments, and a keyword to be used during the scrambling of the corresponding one of the data segments. Each of the segment headers is placed before the corresponding one of the data segments, and each of the source data segments is scrambled according to the scrambling type and the key word identified in the corresponding one of the segment headers to obtain an encrypted data stream.

According to another aspect of the invention, a system for dynamic data encryption comprises a scrambling apparatus for generating an encrypted data stream, and a reverse scrambling apparatus. The scrambling apparatus includes a source data provider, a segment header generator, a multiplexer, and a scrambler.

The source data provider provides a plurality of source data segments, while the segment header generator generates a plurality of segment headers that correspond respectively to the source data segments. Each of the segment headers includes a start code to indicate start of the corresponding one of the data segments, a scrambling type to identify a selected one of at least two scrambling algorithms available for use when scrambling the corresponding one of the data segments, and a keyword to be used during the scrambling of the corresponding one of the data segments. The multiplexer is connected to the source data provider and the segment header generator, and is operable so as to place each of the segment headers before the corresponding one of the data segments. The scrambler is connected to the multiplexer and is operable so as to scramble each of the source data segments according to the scrambling type and the key word identified in the corresponding one of the segment headers to obtain the encrypted data stream.

Preferably, the system further includes an initial code generator which is connected to the multiplexer and which generates an initial code that is placed before the segment headers and the data segments to indicate start of the encrypted data stream.

The reverse scrambling apparatus recovers the source data segments from the encrypted data stream, and includes a first in, first out memory unit, a sync detector, a key/type extractor, a descrambler, an initial code generator and a retrieved data provider.

In one embodiment, the scrambler further scrambles each of the segment headers according to the scrambling type and the key word identified in a preceding one of the segment headers, thereby resulting in a further level of protection against software piracy.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
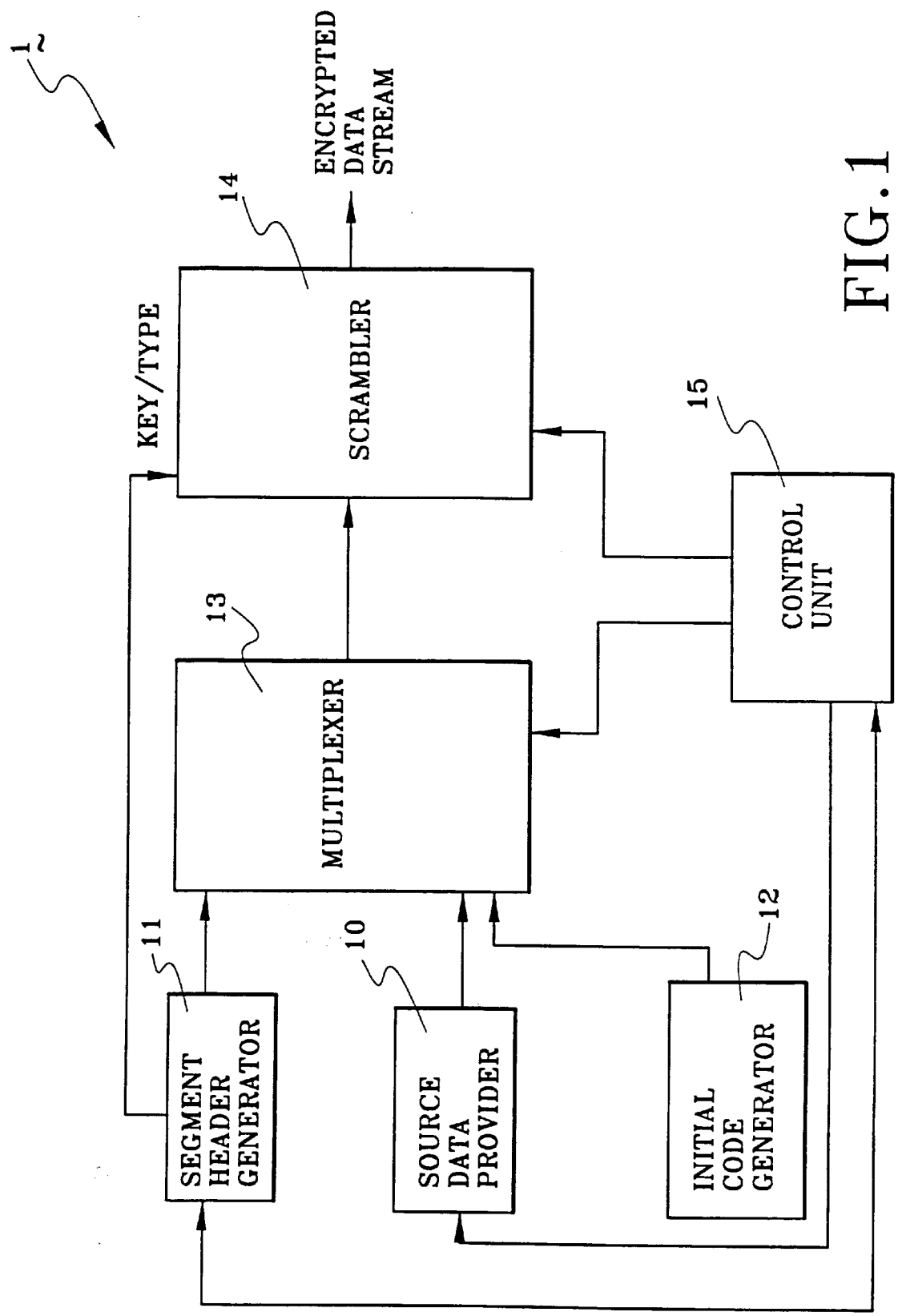
FIG. 1 is a schematic circuit block diagram of the first preferred embodiment of a scrambling apparatus of a dynamic data encryption system according to the present invention.

Referring to FIG. 1, the first preferred embodiment of a data encryption system according to the present invention is shown to comprise a scrambling apparatus 1 which includes a source data provider 10, a segment header generator 11, an initial code generator 12, a multiplexer 13, a scrambler 14 and a control unit 15.

Figure 2:
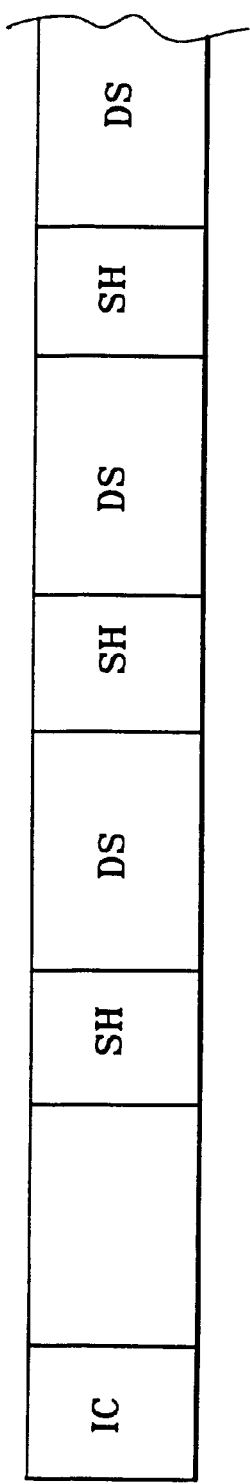
FIG. 2 illustrates the format of an encrypted data stream that is generated by the scrambling apparatus of the first preferred embodiment.

As shown in FIG. 2, the scrambling apparatus 1 generates an encrypted data stream that includes an initial code (IC) for indicating the start of the encrypted data stream, a plurality of data segments (DS) placed one after another, and a plurality of segment headers (SH), each of which is placed before a corresponding one of the data segments (DS). The scrambling algorithms used for the scrambled data segments differ from one another. Moreover, the key words for the scrambled data segments that use the same scrambling algorithm preferably differ from one another.

The scrambling algorithms employed in the present invention are known in the art and can include exclusive logic scrambling and null scrambling, where the source data segments are maintained in their original form.

Figure 3:
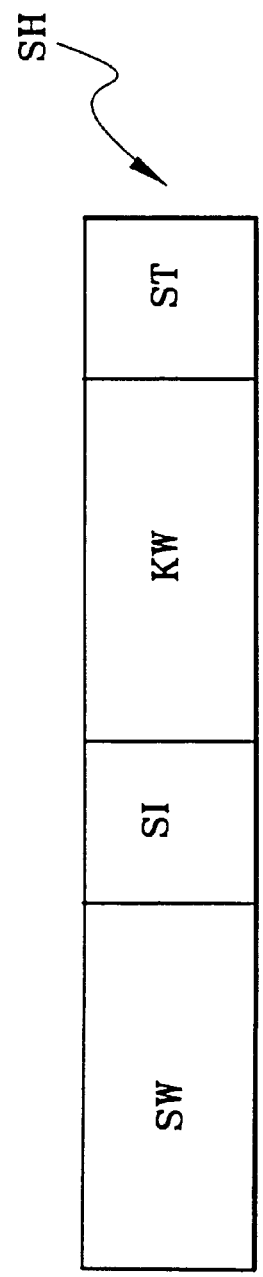
FIG. 3 illustrates a segment header for a data segment of the encrypted data stream that is generated by the scrambling apparatus of the first preferred embodiment.

As shown in FIG. 3, the segment header (SH) includes a sync word field (SW) for recording a start code to indicate the start of the corresponding data segment, a segment information field (SI) for recording segment information for the corresponding data segment, such as the segment length, a scrambling type field (ST) for recording a scrambling type to identify a selected one of at least two scrambling algorithms available for use when scrambling the corresponding data segment, and a key word field (KW) for recording a key word to be used during the scrambling of the corresponding data segment. Preferably, the scrambling type and the key word of each of the segment headers (SH) are selected randomly. In addition, a pseudo key is recorded in the key word field (KW) if null scrambling is selected.

Referring again to FIG. 1, the source data provider 10 is connected to and is controlled by the control unit 15 to provide source data segments that are to be scrambled before transfer or transmission. Each source data segment has an arbitrary length that depends on the assignment of the control unit 15.

The segment header generator 11 is connected to and is controlled by the control unit 15 so as to generate the segment headers for the source data segments. The segment header generator 11 provides the scrambling type and the key word of each segment header to the scrambler 14 so as to control operation of the same.

The initial code generator 12 generates the initial code that is used to initialize a reverse scrambling apparatus 2 (see FIG. 4) of the data encryption system in order to enable the reverse scrambling apparatus 2 to receive and interpret the encrypted data stream.

The multiplexer 13 has data inputs connected respectively to the source data provider 10, the segment header generator 11 and the initial code generator 12, and a select input connected to the control unit 15. As such, the source data segments, the segment headers and the initial code can be multiplexed to obtain a serial data stream.

The scrambler 14 receives the serial data stream from the multiplexer 13 and is controlled by the control unit 15 to perform a scrambling operation for each of the source data segments in accordance with the scrambling algorithm and the key word in the corresponding segment header as obtained from the segment header generator 11.

Therefore, the source data segments are scrambled using different scrambling algorithms and different key words that are recorded in the respective segment header to effectively prevent piracy of the original source data.

Figure 4:
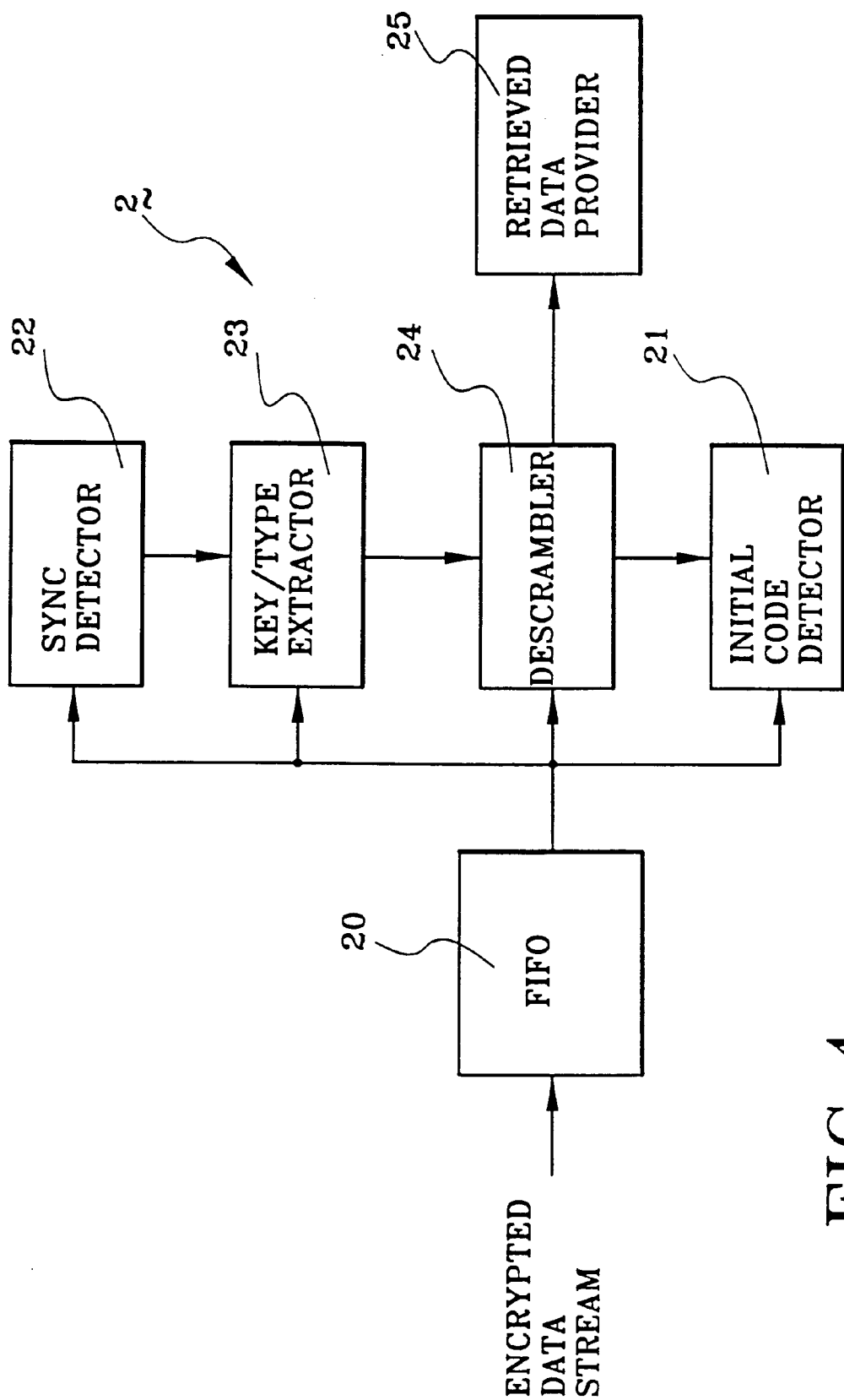
FIG. 4 is a schematic circuit block diagram of a reverse scrambling apparatus of the first preferred embodiment for recovering source data from the encrypted data stream.

Referring to FIG. 4, the reverse scrambling apparatus 2 of the first preferred embodiment is shown to include a first in, first out (FIFO) memory unit 20, an initial code detector 21, a sync detector 22, a key/type extractor 23, a descrambler 24 and a retrieved data provider 25.

The FIFO memory unit 20 receives the encrypted data stream from the scrambling apparatus 1 through a transmission medium or a transfer path. The initial code detector 21, the sync detector 22, the key/type extractor 23, and the descrambler 24 receive the encrypted data stream from the FIFO memory unit 20.

Upon detection of the initial code from the output of the FIFO memory unit 20, the initial code detector 21 initializes the descrambler 24. Upon detection by the sync detector 22 of the presence of the start code of one of the segment headers from the output of the FIFO memory unit 20, indicating the start of one of the data segments, the sync detector 22 enables the key/type extractor 23 to extract the scrambling type and the key word from the segment header. The key/type extractor 23 provides the extracted scrambling type and the key word to the descrambler 24, thereby enabling the latter to perform a reverse scrambling operation on one of the data segments in the encrypted data stream in order to recover the source data segment. The source data segments outputted by the descrambler 24 are collected by the retrieved data provider 25, which can provide the same to a data processing unit (not shown) for further processing.

In the scrambling apparatus of the second preferred embodiment of a dynamic data encryption system according to this invention, the scrambler is controlled by the control unit so as to further scramble each of the segment headers according to the scrambling type and the key word identified in a preceding one of the segment headers, thereby resulting in stronger protection against software piracy. The first segment header after the initial code is preferably left unscrambled. The construction of the scrambling apparatus of the second preferred embodiment is similar to that of the first preferred embodiment and will not be detailed further.

Figure 5:
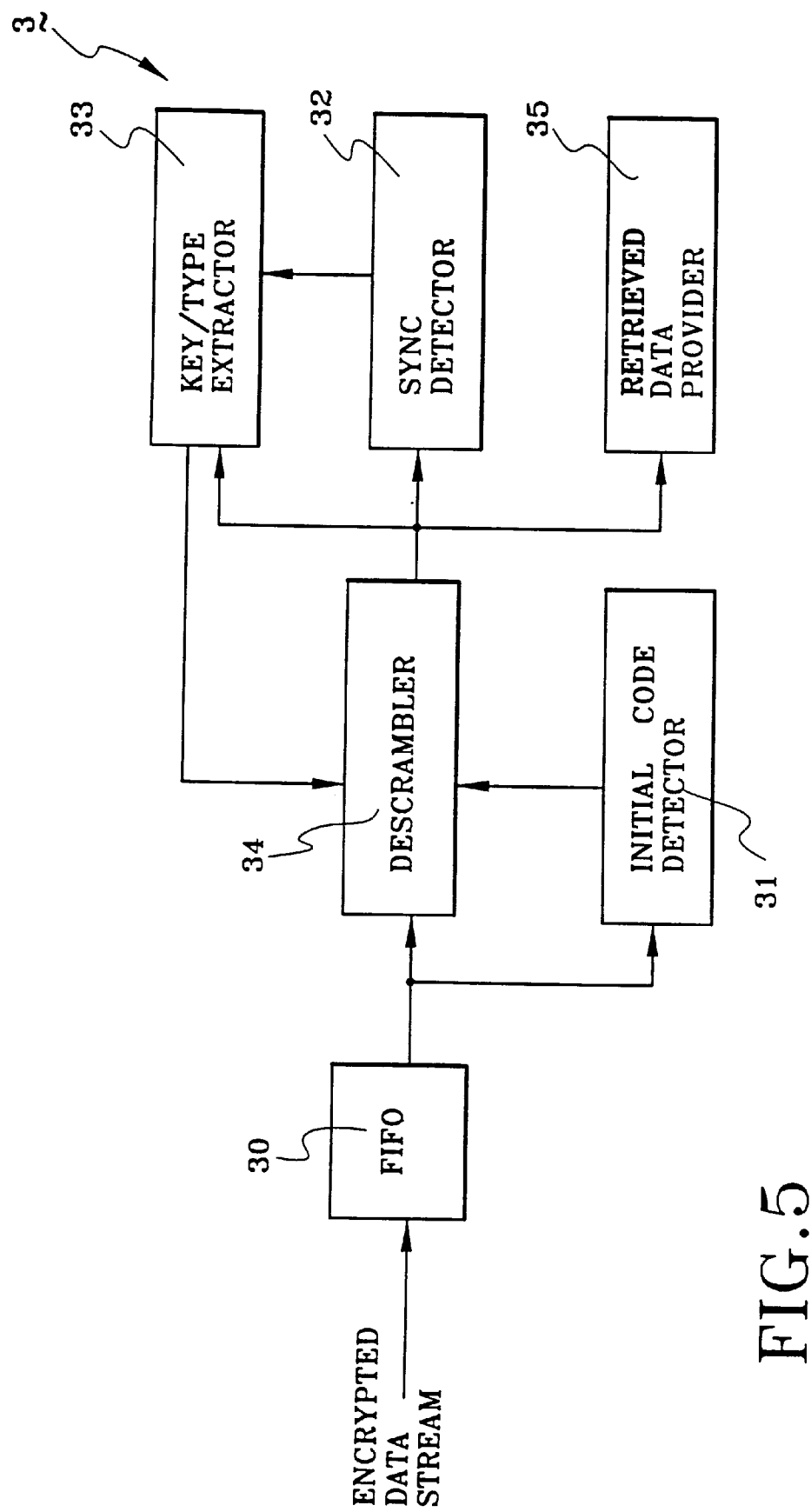
FIG. 5 is a schematic circuit block diagram of a reverse scrambling apparatus for the second preferred embodiment of a dynamic data encryption system according to the present invention.

Referring to FIG. 5, the reverse scrambling apparatus 3 of the second preferred embodiment is shown to include a first in, first out (FIFO) memory unit 30, an initial code detector 31, a sync detector 32, a key/type extractor 33, a descrambler 34 and a retrieved data provider 35.

The FIFO memory unit 30 receives the encrypted data stream from the scrambling apparatus through a transmission medium or a transfer path. The descrambler 34 is connected to the FIFO memory unit 30 and receives the encrypted data stream therefrom. The initial code detector 31 is connected to the FIFO memory unit 30 and the descrambler 34, and initializes the descrambler 34 upon detection of the initial code in the encrypted data stream. The sync detector 32 is connected to the descrambler 34 and detects the presence of the start code of a first one of the segment headers from the descrambler 34. The key/type extractor 33 is connected to the descrambler 34 and the sync detector 32, and is activated by the sync detector 32 upon detection by the latter of the start code of the first one of the segment headers. The key/type extractor 33 extracts the scrambling type and the key word from the first one of the segment headers, and controls the descrambler 34 to perform a reverse scrambling operation on a first one of the data segments and a second one of the segment headers from the FIFO memory unit 30 according to the scrambling type and the key word extracted by the key/type extractor 33 from the first one of the segment headers in order to recover the source data segment. The retrieved data provider 35 is connected to the descrambler 34 and collects the source data segments therefrom. As with the previous embodiment, the retrieved data provider 35 can provide the collected source data segments to a data processing unit (not shown) for further processing.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for dynamic data encryption, comprising:

providing a plurality of source data segments;

generating a plurality of segment headers that correspond respectively to the source data segments, each of the segment headers including a start code to indicate start of the corresponding one of the data segments, a scrambling type to identify a selected one of at least two scrambling algorithms available for use when scrambling the corresponding one of the data segments, and a keyword to be used during the scrambling of the corresponding one of the data segments;

placing each of the segment headers before the corresponding one of the data segments; and scrambling each of the source data segments according to the scrambling type and the key word identified in the corresponding one of the segment headers to obtain an encrypted data stream;

whereby, the scrambling algorithms used when scrambling a successive pair of the source data segments can differ from one another.

2. The method of claim 1, wherein each of the source data segments has an arbitrary length.

3. The method of claim 2, wherein each of the segment headers further includes segment information to indicate the length of the corresponding one of the data segments.

4. The method of claim 1, further comprising the step of generating an initial code that is placed before the segment headers and the data segments to indicate start of the encrypted data stream.

5. The method of claim 1, further comprising the step of scrambling each of the segment headers according to the scrambling type and the key word identified in a preceding one of the segment headers.

6. The method of claim 1, wherein the scrambling type and the key word of each of the segment headers are selected randomly.

7. A system for dynamic data encryption, comprising a scrambling apparatus for generating an encrypted data stream, said scrambling apparatus including:

a source data provider for providing a plurality of source data segments;

a segment header generator for generating a plurality of segment headers that correspond respectively to the source data segments, each of the segment headers including a start code to indicate start of the corresponding one of the data segments, a scrambling type to identify a selected one of at least two scrambling algorithms available for use when scrambling the corresponding one of the data segments, and a key word to be used during the scrambling of the corresponding one of the data segments;

a multiplexer connected to said source data provider and said segment header generator and operable so as to place each of the segment headers before the corresponding one of the data segments; and a scrambler connected to said multiplexer and operable so as to scramble each of the source data segments according to the scrambling type and the key word identified in the corresponding one of the segment headers to obtain the encrypted data stream;

whereby, the scrambling algorithms used when scrambling a successive pair of the source data segments can differ from one another.

8. The system of claim 7, wherein each of the source data segments has an arbitrary length.

9. The system of claim 8, wherein each of the segment headers further includes segment information to indicate the length of the corresponding one of the data segments.

10. The system of claim 7, further comprising an initial code generator which is connected to said multiplexer and which generates an initial code that is placed before the segment headers and the data segments to indicate start of the encrypted data stream.

11. The system of claim 10, further comprising a reverse scrambling apparatus to recover the source data segments from the encrypted data stream, said reverse scrambling apparatus including:

a first in, first out memory unit for receiving the encrypted data stream from said scrambling apparatus;

a sync detector connected to said memory unit to detect presence of the start code of one of the segment headers in the encrypted data stream from said memory unit;

a key/type extractor connected to said memory unit and said sync detector, said key/type extractor being activated by said sync detector upon detection by said sync detector of the start code of one of the segment headers in the encrypted data stream, said key/type extractor extracting the scrambling type and the key word from said one of the segment headers;

a descrambler connected to said memory unit and said key/type extractor, said descrambler performing a reverse scrambling operation on one of the data segments in the encrypted data stream according to the scrambling type and the key word extracted by said key/type extractor from the corresponding one of the segment headers in order to recover the source data segment;

an initial code detector connected to said memory unit and said descrambler, said initial code detector initializing said descrambler upon detection of the initial code in the encrypted data stream; and a retrieved data provider connected to said descrambler for collecting the source data segments therefrom.

12. The system of claim 7, further comprising a reverse scrambling apparatus to recover the source data segments from the encrypted data stream, said reverse scrambling apparatus including:

a first in, first out memory unit for receiving the encrypted data stream from said scrambling apparatus;

a sync detector connected to said memory unit to detect presence of the start code of one of the segment headers in the encrypted data stream from said memory unit;

a key/type extractor connected to said memory unit and said sync detector, said key/type extractor being activated by said sync detector upon detection by said sync detector of the start code of one of the segment headers in the encrypted data stream, said key/type extractor extracting the scrambling type and the key word from said one of the segment headers;

a descrambler connected to said memory unit and said key/type extractor, said descrambler performing a reverse scrambling operation on one of the data segments in the encrypted data stream according to the scrambling type and the key word extracted by said key/type extractor from the corresponding one of the segment headers in order to recover the source data segment; and a retrieved data provider connected to said descrambler for collecting the source data segments therefrom.

13. The system of claim 7, wherein said scrambler is further operable so as to scramble each of the segment headers according to the scrambling type and the key word identified in a preceding one of the segment headers.

14. The system of claim 13, further comprising a reverse scrambling apparatus to recover the source data segments from the encrypted data stream, said reverse scrambling apparatus including:
   a first in, first out memory unit for receiving the encrypted data stream from said scrambling apparatus;
   a descrambler connected to said memory unit to receive the encrypted data stream therefrom;
   a sync detector connected to said descrambler to detect presence of the start code of a first one of the segment headers from said descrambler;
   a key/type extractor connected to said descrambler and said sync detector, said key/type extractor being activated by said sync detector upon detection by said sync detector of the start code of the first one of the segment headers, said key/type extractor extracting the scrambling type and the key word from the first one of the segment headers and controlling said descrambler to perform a reverse scrambling operation on a first one of the data segments and a second one of the segment headers from said memory unit according to the scrambling type and the key word extracted by said key/type extractor in order to recover the source data segment; and
   a retrieved data provider connected to said descrambler for collecting the source data segments therefrom.

15. The system of claim 10, wherein said scrambler is further operable so as to scramble each of the segment headers according to the scrambling type and the key word identified in a preceding one of the segment headers.

16. The system of claim 15, further comprising a reverse scrambling apparatus to recover the source data segments from the encrypted data stream, said reverse scrambling apparatus including:
   a first in, first out memory unit for receiving the encrypted data stream from said scrambling apparatus;
   a descrambler connected to said memory unit to receive the encrypted data stream therefrom;
   an initial code detector connected to said memory unit and said descrambler, said initial code detector initializing said descrambler upon detection of the initial code in the encrypted data stream;
   a sync detector connected to said descrambler to detect presence of the start code of a first one of the segment headers from said descrambler;
   a key/type extractor connected to said descrambler and said sync detector, said key/type extractor being activated by said sync detector upon detection by said sync detector of the start code of the first one of the segment headers, said key/type extractor extracting the scrambling type and the key word from the first one of the segment headers and controlling said descrambler to perform a reverse scrambling operation on a first one of the data segments and a second one of the segment headers from said memory unit according to the scrambling type and the key word extracted by said key/type extractor in order to recover the source data segment; and
   a retrieved data provider connected to said descrambler for collecting the source data segments therefrom.

17. The system of claim 7, wherein the scrambling type and the key word of each of the segment headers are randomly selected by said segment header generator.

18. A reverse scrambling apparatus for recovering source data segments from an encrypted data stream that includes a plurality of data segments and a plurality of segment headers, each of the segment headers being placed before a corresponding one of the data segments and including a start code to indicate start of the corresponding one of the data segments, a scrambling type to identify a selected one of at least two scrambling algorithms used when scrambling the corresponding one of the data segments, and a key word used during the scrambling of the corresponding one of the data segments, said reverse scrambling apparatus comprising:
   a first in, first out memory unit for receiving the encrypted data stream;
   a sync detector connected to said memory unit to detect presence of the start code of one of the segment headers in the encrypted data stream from said memory unit;
   a key/type extractor connected to said memory unit and said sync detector, said key/type extractor being activated by said sync detector upon detection by said sync detector of the start code of one of the segment headers in the encrypted data stream, said key/type extractor extracting the scrambling type and the key word from said one of the segment headers;
   a descrambler connected to said memory unit and said key/type extractor, said descrambler performing a reverse scrambling operation on one of the data segments in the encrypted data stream according to the scrambling type and the key word extracted by said key/type extractor from the corresponding one of the segment headers in order to recover the source data segment; and
   a retrieved data provider connected to said descrambler for collecting the source data segments therefrom.

19. The reverse scrambling apparatus as claimed in claim 18, the encrypted data stream further including an initial code that is placed before the segment headers and the data segments to indicate start of the encrypted data stream, wherein said reverse scrambling apparatus. further comprises an initial code detector connected to said memory unit and said descrambler, said initial code detector initializing said descrambler upon detection of the initial code in the encrypted data stream.

20. A reverse scrambling apparatus for recovering source data segments from an encrypted data stream that includes a plurality of data segments and a plurality of segment headers, each of the segment headers being placed before a corresponding one of the data segments and including a start code to indicate start of the corresponding one of the data segments, a scrambling type to identify a selected one of at least two scrambling algorithms used when scrambling the corresponding one of the data segments, and a key word used during the scrambling of the corresponding one of the data segments, each of the segment headers being scrambled according to the scrambling type and the key word identified in a preceding one of the segment headers, said reverse scrambling apparatus comprising:
   a first in, first out memory unit for receiving the encrypted data stream;
   a descrambler connected to said memory unit to receive the encrypted data stream therefrom;
   a sync detector connected to said descrambler to detect presence of the start code of a first one of the segment headers from said descrambler;

a key/type extractor connected to said descrambler and said sync detector, said key/type extractor being activated by said sync detector upon detection by said sync detector of the start code of the first one of the segment headers, said key/type extractor extracting the scrambling type and the key word from the first one of the segment headers and controlling said descrambler to perform a reverse scrambling operation on a first one of the data segments and a second one of the segment headers from said memory unit according to the scrambling type and the key word extracted by said key/type extractor in order to recover the source data segment; and a retrieved data provider connected to said descrambler for collecting the source data segments therefrom.

21. The reverse scrambling apparatus as claimed in claim 20, the encrypted data stream further including an initial code that is placed before the segment headers and the data segments to indicate start of the encrypted data stream, wherein said reverse scrambling apparatus further comprises an initial code detector connected to said memory unit and said descrambler, said initial code detector initializing said descrambler upon detection of the initial code in the encrypted data stream.

* * * * *